United States Patent [19]
Jacobs et al.

[11] Patent Number: 5,256,048
[45] Date of Patent: Oct. 26, 1993

[54] TOOL FOR THE MULTICOMPONENT INJECTION MOLDING OF BRUSH BODIES

[75] Inventors: Gabriel Jacobs, Oostakker; Leonel P. Boucherie, Izegem, both of Belgium

[73] Assignee: G. B. Boucherie N.V., Izegem, Belgium

[21] Appl. No.: 846,853

[22] Filed: Mar. 6, 1992

[30] Foreign Application Priority Data

Mar. 22, 1991 [DE] Fed. Rep. of Germany ... 9103533[U]

[51] Int. Cl.⁵ .............................................. B29C 45/14
[52] U.S. Cl. .................................... 425/130; 264/243; 264/255; 264/328.8; 264/334; 425/444; 425/556; 425/572
[58] Field of Search .................... 264/243, 255, 328.8, 264/334; 425/120, 121, 123, 127, 129.1, 130, 556, 572, 588, 444

[56] References Cited

U.S. PATENT DOCUMENTS

| | | | |
|---|---|---|---|
| 2,923,035 | 2/1960 | Schwartz | 264/247 |
| 3,900,278 | 8/1975 | Beck et al. | 425/123 |
| 4,619,485 | 10/1986 | Lewis, Jr. | 264/243 |
| 4,652,227 | 3/1987 | Aoki | 425/556 |
| 4,744,741 | 5/1988 | Glover | 425/123 |

FOREIGN PATENT DOCUMENTS

| | | |
|---|---|---|
| 2063850 | 12/1970 | Fed. Rep. of Germany . |
| 3408451 | 7/1985 | Fed. Rep. of Germany . |
| 2141799 | 1/1973 | France . |
| 8701329 | 3/1987 | World Int. Prop. O. . |
| 9008637 | 8/1990 | World Int. Prop. O. . |

*Primary Examiner*—Tim Heitbrink
*Attorney, Agent, or Firm*—Sixbey, Friedman, Leedom & Ferguson

[57] ABSTRACT

A tool for the multicomponent injection molding of brush bodies and more particularly of toothbrush bodies, including two tool parts able to be moved towards and away from each other and which between them jointly define a plurality of mold cavities. In accordance with the invention at least two of the mold cavities are permanently associated with different components. The at least one mold cavity, which is permanently associated with the first component to be injected, has a recess in the shaping surface of the one tool part, such recess being able to be shut off by an insert element, which is able to be moved in relation to this tool part and on which a head is formed, which, when the mold cavity is shut off by the insert element, extends into the cavity. The insert element is mounted on a carrier such that a premolding molded in this mold cavity, which is associated with this component to be injected firstly, may be moved into another mold cavity associated with another component. A tool of this type may be produced in a comparatively simple manner and more particularly does not need any rotatable tool halves or any exact symmetry of the mold cavity part in a rotatable tool half.

8 Claims, 3 Drawing Sheets

TOOL FOR THE MULTICOMPONENT INJECTION MOLDING OF BRUSH BODIES

TECHNICAL FIELD OF THE INVENTION

Background of the Invention

The invention relates to a tool for the multicomponent injection molding of brush bodies and more particularly of toothbrush bodies, comprising two tool parts able to be moved towards and away from each other and which between them jointly define a plurality of mold cavities.

Brush bodies made of synthetic resins, more particularly toothbrush bodies, are conventionally produced by injection molding. In recent times a need has arisen for brush bodies molded from a plurality of components. The different components may have a different nature and/or have a different color. For instance, in the case of one toothbrush body the handle part is manufactured with different zones of a component making it easier for the user to get a ggood grip on the brush, such zones at the same time differing in color from the rest of the toothbrush body. Moreover this is a way of endowing the brush handle with permanent, non-smear lettering resistant to wear.

However the tools presently available for multicomponent injection molding are extremely complex. They consist of two mold halves of which the one is able to be turned through 180° in relation to the other in order to move a premolding produced with the first component into a position opposite a mold cavity in the stationary tool half for molding the second component. Simultaneously an empty mold cavity part of the rotatable tool half is moved into a position opposite to a mold cavity part of the stationary tool for injection of the first component. Therefore the mold cavity part of the the rotatable tool half have to alternately cooperate with mold cavity parts for the different component in the stationary tool half and therefore have to be designed for the injection of both components. This renders the use of slides and/or stationary mold cores necessary in order to shut off and open up certain portions in the mold cavity. Owing to the alternating cooperation of the different mold cavity parts in the rotatable tool half with different mold cavity parts of the stationary tool half it is necessary for the mold cavity parts of the rotatable mold half to be made exactly symmetrically and completely identical to each other. In the case of tools for the production of toothbrush bodies this requirement is particularly stringent, for toothbrush members are conventionally manufactured with preformed holes for the tufts of bristles in the bristle bearing part of the brush. In its mold cavity parts the rotatable tool half is manufactured with a relatively large number of, for instance, 40 pins, which are operated by the intermediary of slides. During the rotation of the one tool half the premoldings remain suspended on the projecting pins and are thus secured for movement into the next position. However it is only using a very complicated procedure that it is possible as well to design two respective mold cavity halves with a plurality of slide-operated pins in an exactly symmetrical manner in one tool half.

However it is conventionally necessary for a plurality of parallel mold cavities to be arranged adjacent to each other in one tool half in order to be able to simultaneously injection mold a plurality of brush bodies. Since the requirement for exact symmetry applies for all mold cavity parts of the tool half and additionally there is a requirement for exact mutually opposite positioning as regards the mold cavity parts of the stationary tool half, tools of this type are only able to be manufactured using an extremely complicated procedure.

Since finally cooling of the rotatable tool half means that a coolant liquid has to flow through ducts in the same and the supply and removal such coolant duct may only be through one central shaft, rotary couplings or unions are necessary, which in principle involve the danger of leaks and entail a further complication as regards manufacture of the tool.

SUMMARY OF INVENTION

Accordingly one object of the present invention is to provide a tool for the injection molding of brush bodies and more particularly of toothbrush bodies, which may be produced comparatively simply and more particularly does not involve a rotatable tool half or any exact symmetry of the mold cavity parts of a rotatable tool half.

In the case of a tool of the type initially mentioned this is achieved in accordance with the invention since at least two of the mold cavities are permanently associated with different components, the at least one mold cavity, which is permanently associated with the first component to be injected, has a recess in the shaping surface of the one tool part, such recess being able to be shut off by an insert element, which is able to be moved in relation to this tool part and on which a head is formed, which, when the mold cavity is shut off by the insert element, extends into the cavity, and the insert element is mounted on a carrier, by means of which a premolding molded in this mold cavity, which is associated with this component to be injected firstly, may be moved into a mold cavity associated with another component. The two tool parts are only able to be shifted in relation to each other in translation. Rotation of the one tool part is no longer necessary, because the shifting of the premolding from the cavity, which is associated with the first component, into another mold cavity associated with another component is effected by the intermediary of a separate, moving carrier. During such shifting the premolding is held by the head of the insert element penetrating into its body, such element for its part being mounted on the carrier. After the premolding has been moved into the mold cavity associated with the other component, the head is removed from its body and moved out of the way by further movement of the carrier, following which the tool is shut and the other component is able to be injected. Simultaneously a new premolding is molded in the mold cavity associated with the first component and which has now become free.

It will therefore be seen that:

a) the moving tool part only has to move in translation and it is therefore unnecessary to have rotary coupling means or unions;

b) the mold cavity parts of the moving tool part may be of different construction, that is to say not exactly symmetrical, this being an advantage more particularly in the case of the production of toothbrush bodies, because only one mold cavity part has to be provided with slide-actuated pins in order to constitute the holes for the tufts of bristles; and c) the production rate may be increased, because for changing over the premolding between the mold cavities there is only a small amount of inertia to be overcome.

In accordance with a further possible advantageous development of the invention the insert element is constituted by a rail extending perpendicularly in relation to the longitudinal direction of the mold cavity. The insert element hence occupies but a small portion of the shaping surface of the respective mold cavity. Moreover the insert element is preferably provided with a shaping surface on the its side facing the mold cavity. Owing to the presence of the head projecting into the mold cavity there is therefore no impairment of the configuration of the brush body.

In order to able to readily remove the head from the premolding after the same has been moved into the mold cavity for the other component, in the case of a preferred embodiment of the invention a holder is provided, by means of which the premolding is able to be latched in the mold cavity associated with the other component; then it is only necessary for the insert member with the carrier to be moved clear of the premolding by a movement in translation so that the head of the insert element is pulled out of the same.

The advantages springing from the tool in accordance with the invention are more particularly significant in a case in which a plurality of identical mold cavities are provided adjacent to each other in order to simultaneously produce a plurality of toothbrush bodies. In the case of one such design in accordance with the invention the insert elements of a plurality of adjacently positioned mold cavities are preferably mounted on a common carrier in order to prevent relative movement of the insert elements towards each other.

A particularly simple motion of the system is produced if the carrier is able to be moved with combined translation and rotation.

Further advantageous developments and convenient forms of the invention will be gathered from the following detailed account of one embodiment thereof in conjunction with the accompanying drawings.

DETAILED DESCRIPTION OF THE INVENTION

Figure 1:
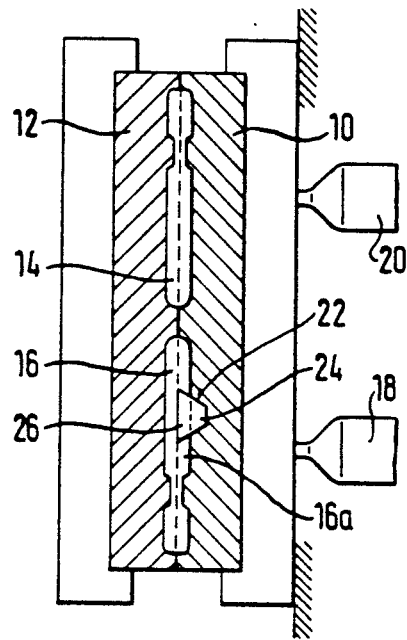
FIGS. 1 through 7 show side elevations of the tool in different stages of operation.

The tool consists of a stationary tool part 10 and a tool part 12 which is able to move, that is to say able to be moved in translation. The tool parts 10 and 12 define an upper mold cavity 14 and a lower mold cavity 16. The outlet of a first injection device 18, which supplies the first component to be injected, opens into the lower mold cavity 16; the outlet of a second injection device 20, which supplies the second component to be injected, opens into the upper mold cavity 14. As clearly shown in the figures it is a question of a tool for the production of toothbrush bodies. The mold cavities 14 and 16 are arranged flush with each other but they are rotationally offset from each other by 180° so that the portions of the mold cavity, in which the handle of the toothbrush body is molded, are adjacent to each other. The lower mold cavity 16 is permanently associated with the first component to be injected. It only has such molding parts as are intended for the molding of the first component. In that portion of the mold cavity 16, in which the bristle bearing part of the toothbrush body is formed, there is a conventional arrangement of slide-operated pins to form the holes for the tufts of bristle. In the shaping surface of the part 16a, formed in the stationary tool part 10, of the lower mold cavity 16 a recess 22 is formed. This recess 22 is able to be shut off by an insert element 24. A head 26 of the insert element 24 extends into the lower mold cavity 16.

Figure 6:
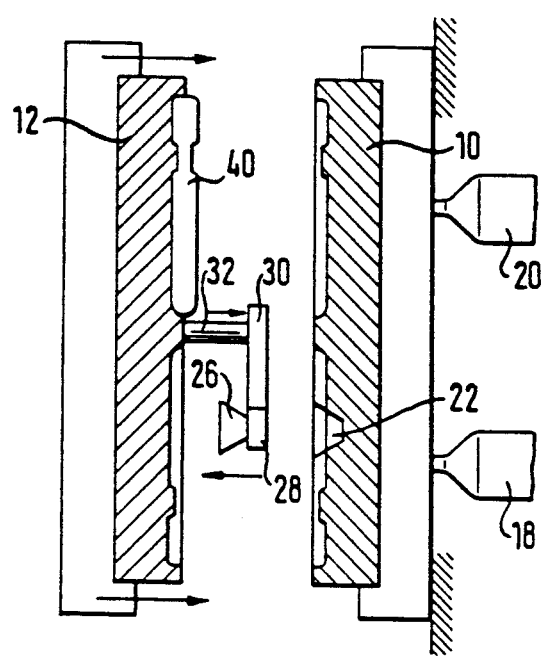
Figure 7:
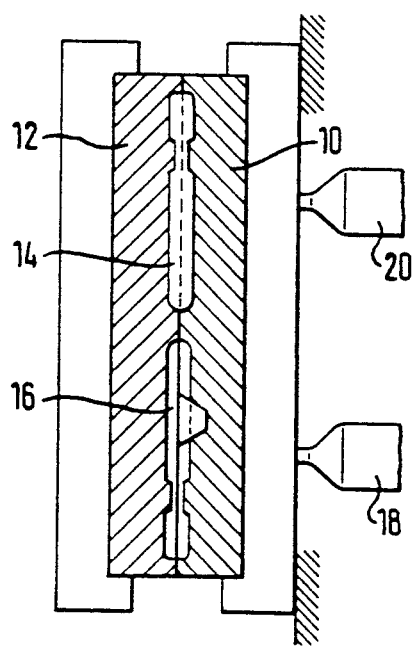
Figure 8:
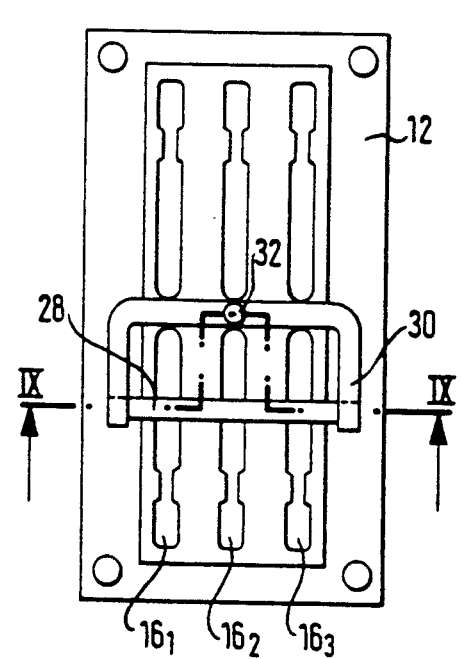
FIG. 8 is a diagrammatic plan view on the side, which is provided with the mold cavities, of the one tool part.

In the illustrated embodiment of the tool there are in all six mold cavities as shown in FIG. 8. FIGS. 1 through 7 respectively illustrate only two mutually opposite mold cavities. The insert elements 24 of all mold cavities in FIG. 8 constitute a rail 28 extending transversely in relation to the longitudinal direction of the mold cavities and which is mounted on a common yoke-like carrier 30. The carrier 30 is carried on the end of a rotary shaft 32 in such a manner as to prevent relative twist. The shaft is able to perform both a rotary movement and also a movement in translation. This is indicated by arrows in FIGS. 3 through 6.

The upper mold cavity 14 is permanently associated with the second component to be injected and only has such molding surfaces as are intended for the molding of the second component. For instance that portion of the mold cavity 14, in which the bristle bearing part of the toothbrush body is received, is shut off to prevent access of the second component, if the second component is only to be present in the handle of the toothbrush. Therefore it is more particularly unnecessary for the mold cavity 14 to be fitted with slide-actuated pins, which correspond to the holes for the tufts of bristles.

The insert element 24 is designed to shut off the recess 22 and on its side facing the mold cavity 16 it has a shaping function. When the tool is shut the insert element 24 fills the recess 22 with a good fit. The head 26 extends approximately as far as the middle plane of the mold cavity 16, into which it extends.

The manner of operation of the tools will now be described.

Considering the lower mold cavity 16, firstly the first component is injected thereinto to constitute a premolding, which is denoted in FIGS. 2 through 6 by reference 40. Certain portions of the premolding are set back or recessed to depart from the configuration of the finished toothbrush body so that they may be filled with the second component. In the mold cavity 16 the bristle bearing part of the premolding is molded with holes for the bristle tufts, since the slide-actuated pins extend into the corresponding portion of the mold cavity 16. The head 26 is molded in the handle part of the premolding 40.

Figure 2:
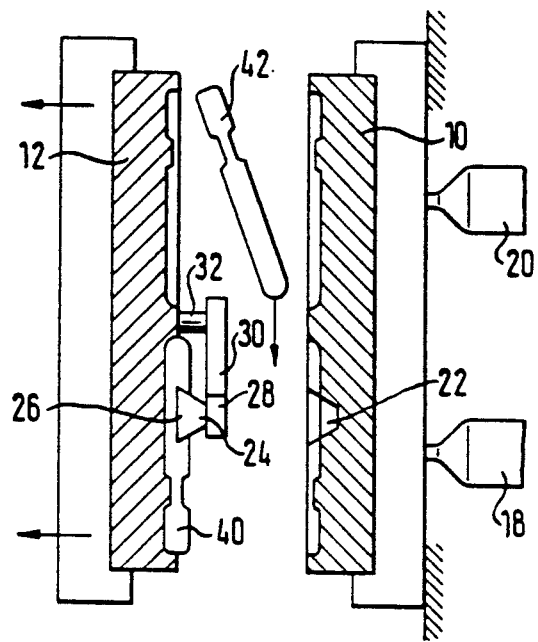

Then after this, as shown in FIG. 2, the tool is opened, for which purpose the tool portion 12 is removed from the tool part 10 by movement in translation. The toothbrush body 42 produced in the preceding phase (see FIG. 1) in the mold cavity 14 by injection molding with the second component is ejected and drops out. The insert element 24 held by the carrier 30 comes clear of the recess 22 of the mold cavity 16a during this step, since it follows movement of the tool part 12.

Figure 3:
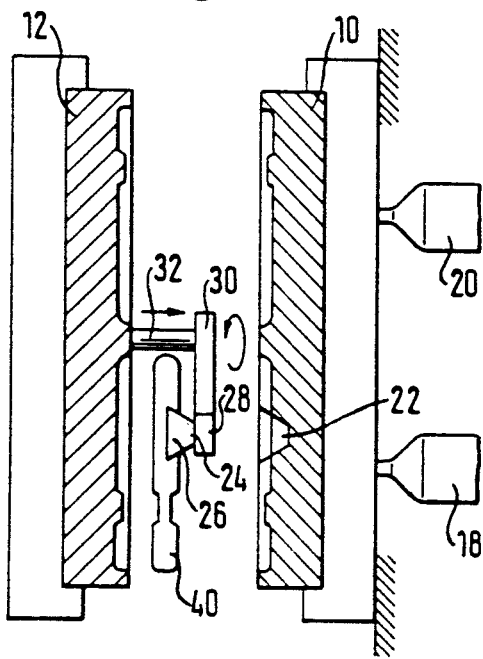
Figure 4:
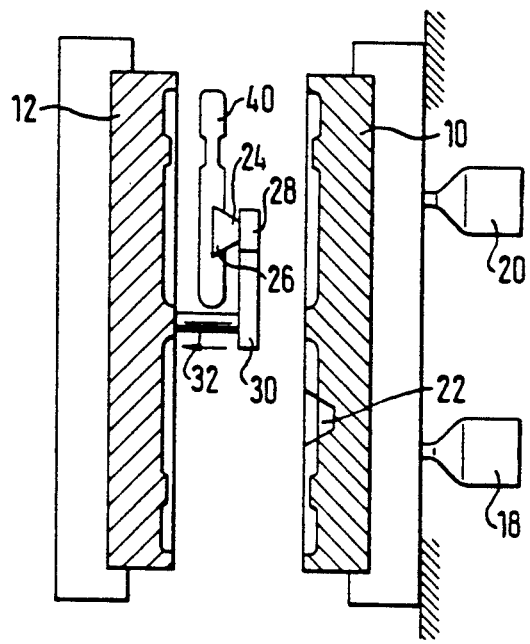
Figure 5:
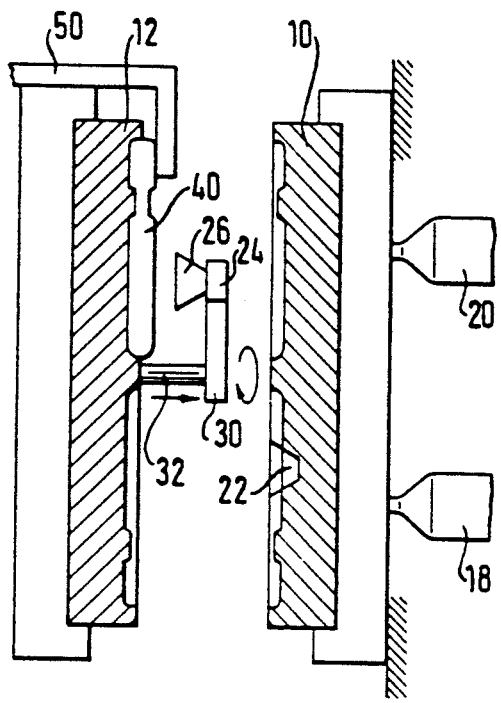

The shaft 32 is now, as shown in FIG. 3, shifted towards the tool part 10, the premolding 40 being lifted out of the mold cavity part of the tool part 12 by way of the carrier 30, the insert element 28 mounted on it and the head 26 thereof. The next step, as shown in FIGS. 3 and 4, is for the shaft 32 to be rotated through 180° so that the premolding is now opposite to the part, formed in the tool part 12, of the mold cavity 14. By then moving back the shaft 32 the premolding 40 is moved into this mold cavity part. The premolding 40 is now held on the tool part 12 by means of holding means 50 as shown in FIG. 5. The shaft 32 is then again moved, as shown in FIG. 5, towards the tool part 10, the head 26 being withdrawn out of the premolding 40. Then, as shown in FIG. 6, the shaft 32 is turned through 180° and then retracted, following which the tool is shut again, as shown in FIG. 7. The part will now be back in the position illustrated in FIG. 1. A new premolding is now injection molded in the mold cavity 16, while the premolding introduced into the mold cavity 14 is finished by injection of the second component.

As shown in FIG. 8 directly, in each case three respective premoldings are molded simultaneously in three adjacently arranged mold cavities using the first component, while in the oppositely arranged row of three adjacent mold cavities three premoldings are produced and finished as the desired toothbrush members by injection of the second component.

Figure 9:
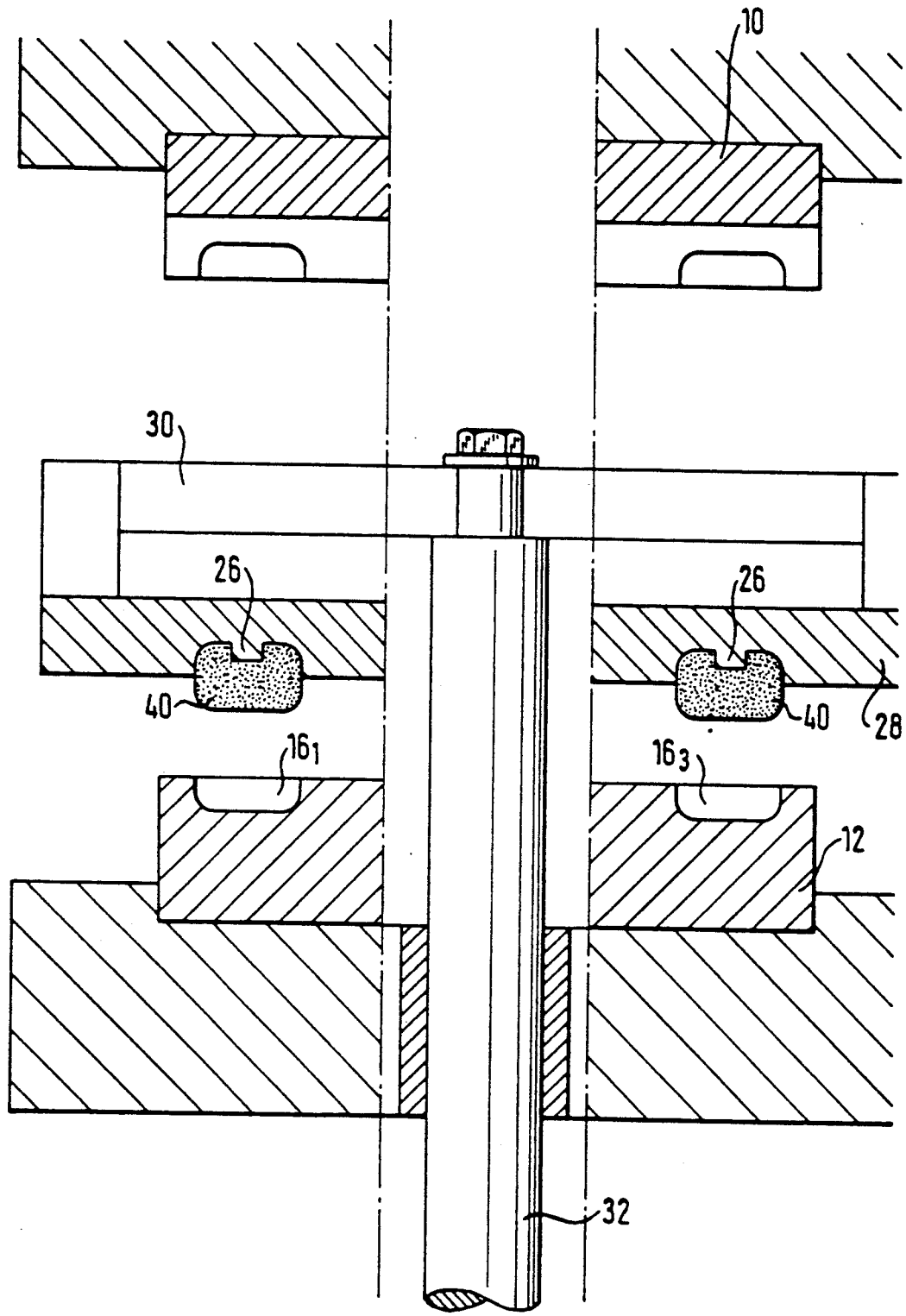
FIG. 9 is a sectional view taken of the line IX—IX of FIG. 8.

FIG. 9 shows details of the tool. More particularly FIGS. 8 and 9 together indicate that the insert elements of three adjacent mold cavities $16_1$, $16_2$ and $16_3$ together constitute the rail 28 extending transversely in relation to longitudinal direction of these mold cavities. In its part, which is respectively opposite to one of the mold cavities $16_1$, $16_2$ and $16_3$, this rail 28 is designed to have a shaping function and is provided with one respective head 26. The condition illustrated in FIG. 9 corresponds to generally to the condition in FIG. 3: the tool is opened, and the premoldings 40 are lifted out of the mold cavities 16 but not yet pivoted towards the mold cavities 14 for the injection of the second component.

In the case of the embodiments of the invention described the toothbrush bodies are only molded in two components. In accordance with the same principle it is possible to injection mold brush bodies in more than two components as well.

We claim:

1. A tool for multicomponent injection molding of brush bodies, comprising first and second tools which are relatively movable towards and away from each other, said tools together forming at least a first mold cavity and at least a second mold cavity, a first injection device associated with said first mold cavity and a second injection device associated with said second mold cavity, a carrier associated with said first and second mold cavities, said carrier having an insert being located in said first mold cavity when said first injection device injects a first molten material into said first mold cavity forming a premolding, said carrier being operable to move said insert with said premolding from said first mold cavity to said second mold cavity when said first and second tools are separated and means for separating said premolding from said insert when said insert has positioned said premolding in said second mold cavity.

2. The tool as claimed in claim 1, wherein said insert is constituted by a rail extending transversely in relation to the longitudinal direction of the first mold cavity.

3. The tool as claimed in claim 1, wherein said insert has a shaping surface of the side thereof facing the first mold cavity.

4. The tool as claimed in claim 1, wherein said premolding introduced into the spaced mold cavity is latched by a holder in the second mold cavity, while a head of the insert is pulled out of the premolding by movement of the insert out of the second mold cavity.

5. The tool as claimed in claim 1, wherein a plurality of identical mold cavities are arranged adjacent to each other in the tool parts and include inserts.

6. The tool as claimed in claim 5, wherein each insert of the plurality of adjacently arranged mold cavities are mounted on a common carrier.

7. The tool as claimed in claim 1, wherein said carrier is movable with a combined movement in rotation and in translation.

8. The tool as claimed in claim 1, wherein the second mold cavity associated with the second injection device only has shaping surfaces for shaping a second portion on said premold.

* * * * *